(12) United States Patent
Wu et al.

(10) Patent No.: US 11,316,262 B2
(45) Date of Patent: Apr. 26, 2022

(54) ANTENNA MODULE AND IN-VEHICLE INFOTAINMENT DEVICE

(71) Applicant: PEGATRON CORPORATION, Taipei (TW)

(72) Inventors: Chien-Yi Wu, Taipei (TW); Shih-Keng Huang, Taipei (TW); Chao-Hsu Wu, Taipei (TW); Sheng-Chin Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 127 days.

(21) Appl. No.: 16/882,180

(22) Filed: May 22, 2020

(65) Prior Publication Data

US 2021/0005959 A1 Jan. 7, 2021

(30) Foreign Application Priority Data

Jul. 3, 2019 (TW) .................................. 108123496

(51) Int. Cl.
*H01Q 1/32* (2006.01)
*H01Q 5/328* (2015.01)
*H01Q 5/35* (2015.01)

(52) U.S. Cl.
CPC .............. *H01Q 1/32* (2013.01); *H01Q 5/328* (2015.01); *H01Q 5/35* (2015.01)

(58) Field of Classification Search
CPC ............. H01Q 1/32; H01Q 5/328; H01Q 5/35
See application file for complete search history.

(56) References Cited

U.S. PATENT DOCUMENTS

| 2004/0075613 | A1* | 4/2004 | Jarmuszewski | H01Q 9/26 343/702 |
| 2011/0163922 | A1* | 7/2011 | Wang | H01Q 1/38 343/702 |
| 2015/0243165 | A1* | 8/2015 | Elsheemy | B60R 25/00 340/906 |
| 2016/0164561 | A1* | 6/2016 | Brey | B60R 11/0205 455/73 |
| 2016/0197395 | A1* | 7/2016 | Ziv | H01Q 9/42 343/841 |

FOREIGN PATENT DOCUMENTS

| CN | 203774449 | 8/2014 |
| CN | 204391245 | 6/2015 |
| CN | 107611563 | 1/2018 |
| CN | 104795623 | 4/2018 |
| TW | I509892 | 11/2015 |
| TW | I520433 | 2/2016 |

\* cited by examiner

*Primary Examiner* — Dieu Hien T Duong
(74) *Attorney, Agent, or Firm* — J.C. Patents

(57) ABSTRACT

An antenna module includes a first antenna and a second antenna disposed beside the first antenna. The second antenna has a second feed-in end and a second ground end and includes a first radiator, a second radiator and a third radiator. The first radiator extends from the second feed-in end along a direction and has a first slit. The second radiator extends from the second feed-in end along another direction opposite to the direction, is connected to the second ground end in a bent manner, and has a portion of a second slit. The third radiator extends from the second ground end along the direction. Another portion of the second slit is disposed between the first radiator and the third radiator.

17 Claims, 10 Drawing Sheets

ANTENNA MODULE AND IN-VEHICLE INFOTAINMENT DEVICE

CROSS-REFERENCE TO RELATED APPLICATION

This application claims the priority benefit of Taiwan application no. 108123496, filed on Jul. 3, 2019. The entirety of the above-mentioned patent application is hereby incorporated by reference herein and made a part of this specification.

BACKGROUND

Technical Field

The disclosure relates to an antenna module and an in-vehicle infotainment device having the antenna module, and more particularly, to an antenna module which can provide multiple antenna frequency bands and can be disposed in a metal vehicle casing, and an in-vehicle infotainment device having the antenna module.

Description of Related Art

Earlier vehicle antennas were mostly exposed receiver rod antennas, but receiver rod antennas were prone to breakage or damage. Later, with the combination with the vehicle body structure, vehicle antennas have evolved into shark fin-shaped antennas disposed on the car roof to reduce the probability of breakage or damage to the antenna. However, the above vehicle antennas are all disposed outside the vehicle. If the vehicle antenna is to be designed in the metal vehicle casing, how to avoid the effect of the metal vehicle casing on the antenna and provide multiple antenna frequency bands is currently an issue for research.

SUMMARY

The disclosure provides an antenna module which can provide multiple antenna frequency bands and can be disposed in a metal vehicle casing.

The disclosure provides an in-vehicle infotainment device having the above antenna module.

An antenna module of the disclosure includes a first antenna and a second antenna. The first antenna is configured to resonate a first high frequency band and has a first feed-in end and a first ground end. The second antenna is formed in an L-shape, and the first antenna is located in a notch defined by the L-shape. The second antenna is configured to resonate a low frequency band and a second high frequency band and has a second feed-in end and a second ground end. The second antenna includes a first radiator, a second radiator, and a third radiator. The first radiator extends from the second feed-in end along a direction and includes a first slit. The second radiator extends from the second feed-in end along another direction opposite to the direction and is connected to the second ground end in a bent manner. The second radiator includes a portion of a second slit. The third radiator extends from the second ground end along the direction. Another portion of the second slit is disposed between the first radiator and the third radiator.

An in-vehicle infotainment device of the disclosure includes a display, the above antenna module, a first circuit module, and a second circuit board. A first circuit board of the first circuit module is signal-connected to the first antenna of the antenna module and the display. The second circuit board is signal-connected to the second antenna of the antenna module.

Based on the above, the antenna module of the disclosure has the first antenna and the second antenna and can provide the advantage of multiple antennas. The first antenna is located in a notch defined by the L-shape of the second antenna, which can reduce the overall size. The first antenna and the second antenna each have their own ground end, so that the two antennas can have good isolation. In addition, the first radiator of the second antenna extends from the second feed-in end and has the first slit. The second radiator extends from the second feed-in end toward another direction and is connected to the second ground end in a bent manner. The second radiator has a portion of the second slit. With the above structure, the first radiator and the second radiator of the second antenna are in the form of a PIFA, which is less susceptible to the effect of wiring and the metal environment and can be disposed in the metal vehicle casing, while good characteristics of the second antenna at the low frequency band (e.g., the second frequency band) can still be maintained.

To make the aforementioned more comprehensible, several embodiments accompanied with drawings are described in detail as follows.

DESCRIPTION OF THE EMBODIMENTS

Figure 1:
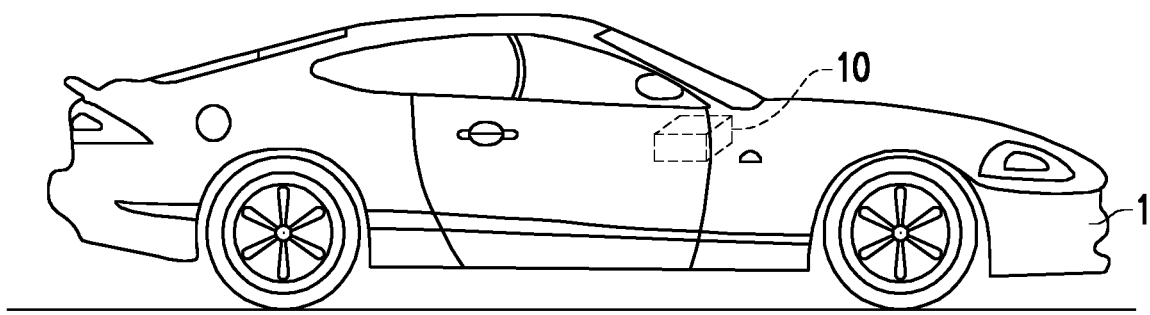
FIG. 1 is a schematic view showing an in-vehicle infotainment device configured in a vehicle according to an embodiment of the disclosure.

FIG. 1 is a schematic view showing an in-vehicle infotainment device configured in a vehicle according to an embodiment of the disclosure. Referring to FIG. 1, an in-vehicle infotainment device 10 of this embodiment is configured in a vehicle 1. The in-vehicle infotainment device 10 is, for example, a display device located at the front between the driver's seat and the front passenger seat (i.e., below the front windshield of the vehicle 1), and may be used to display navigation information, play TV programs, etc. However, the configuration position and function of the in-vehicle infotainment device 10 are not limited thereto. In this embodiment, a display device and a two-in-one antenna module 50 are integrated in the in-vehicle infotainment device 10, so that the in-vehicle infotainment device 10 can provide more diverse functions.

Figure 2:
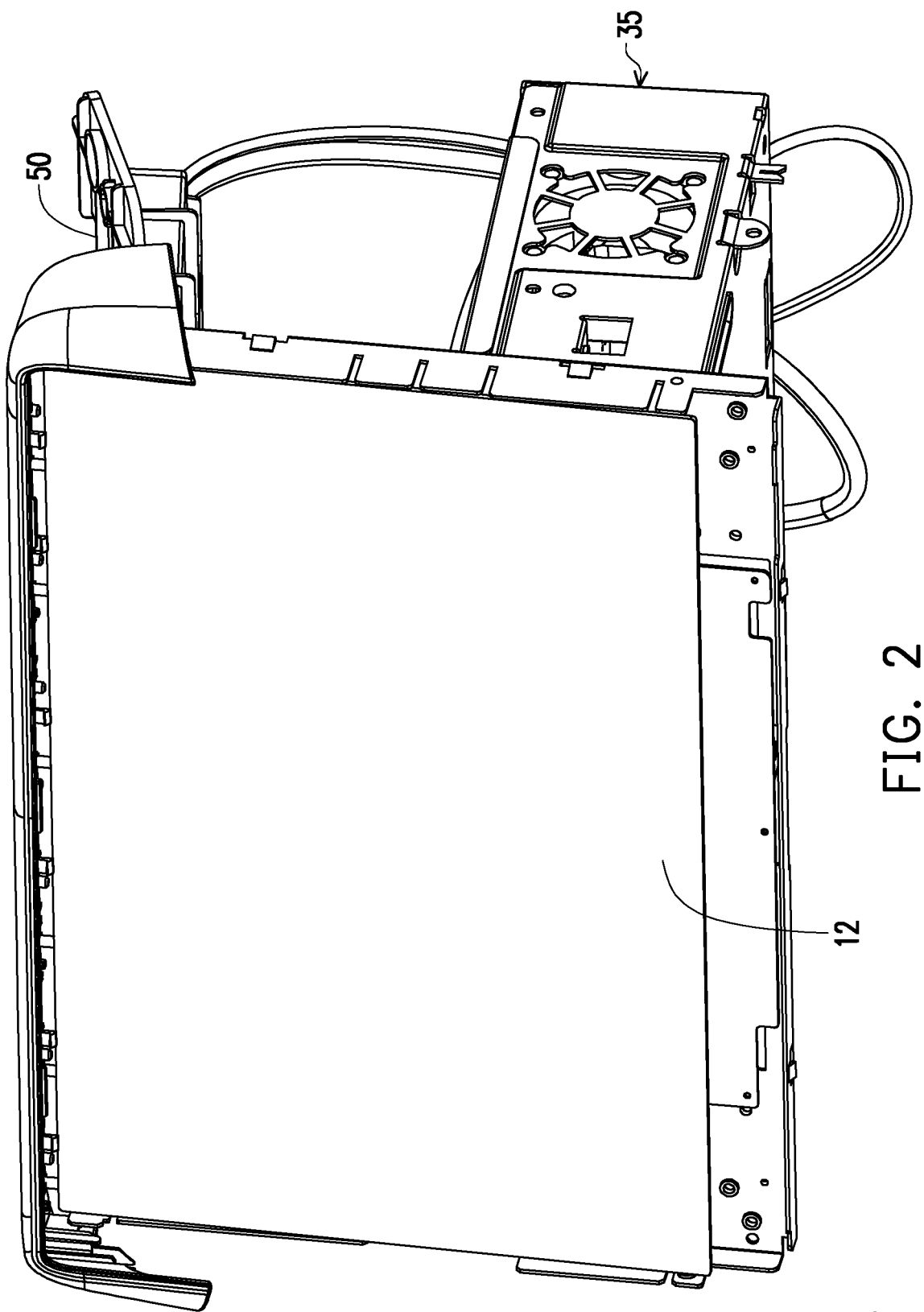
FIG. 2 is a partial perspective view showing the in-vehicle infotainment device of FIG. 1.
Figure 3:
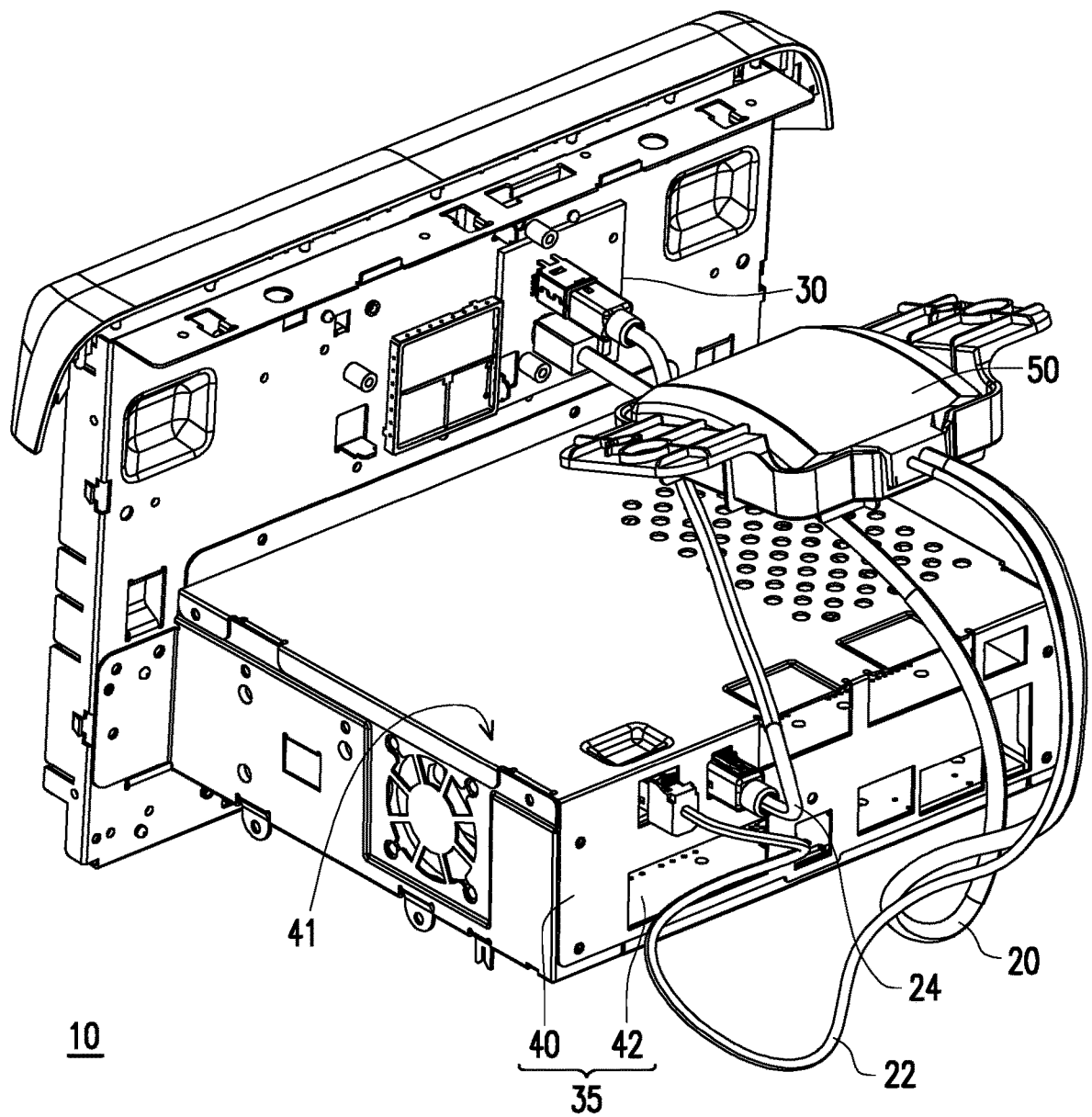
FIG. 3 is a partial perspective view of FIG. 2 from another perspective.

FIG. 2 is a partial perspective view showing the in-vehicle infotainment device of FIG. 1. FIG. 3 is a partial perspective view of FIG. 2 from another perspective. FIG. 2 and FIG. 3 omit some casings and components to show the structure of this application more clearly. As shown in FIG. 2 and FIG. 3, in this embodiment, the in-vehicle infotainment device 10 includes a display 12, an antenna module 50, a first circuit module 35, and a second circuit board 30 (as shown in FIG. 3). In this embodiment, the antenna module 50 is a two-in-one GPS and LTE antenna. FIG. 2 and FIG. 3 only show the plastic housing of the antenna module 50, and the antenna module 50 may be further fixed by a plastic fixing bracket (not shown). The antenna structure of the antenna module 50 will be described in detail with reference to FIG. 6 and FIG. 7.

As shown in FIG. 3, the first circuit module 35 includes a metal casing 40 and a first circuit board 42 located in the metal casing 40. The first circuit board 42 is a motherboard of the in-vehicle infotainment device 10, and the first circuit board 42 has a GPS chip (not shown) provided thereon. The GPS chip is signal-connected to a first antenna 60 (i.e., a GPS antenna, shown in FIG. 6) in the antenna module 50 via a first coaxial transmission cable 22. Moreover, the display 12 is also electrically connected to the first circuit board 42.

In this embodiment, the second circuit board 30 is a circuit board of an LTE antenna, which has an LTE chip (not shown) provided thereon and is signal-connected to a second antenna 70 (i.e., an LTE antenna, shown in FIG. 6) of the antenna module 50 via a second coaxial transmission cable 20. Moreover, in this embodiment, the second circuit board 30 is further electrically connected to a power source (not shown) in the first circuit module 35 via a transmission cable 24, so that the power source in the first circuit module 35 can supply power to the second circuit board 30. The second coaxial transmission cable 20 and the transmission cable 24 may be fixed together to reduce mutual interference of the transmission cables resulting from crossing each other. In this embodiment, the diameter of the second coaxial transmission cable 20 is, for example, 5 mm, and the diameter of the first coaxial transmission cable 22 is, for example, 2.9 mm, but the sizes are not limited thereto.

Figure 4:
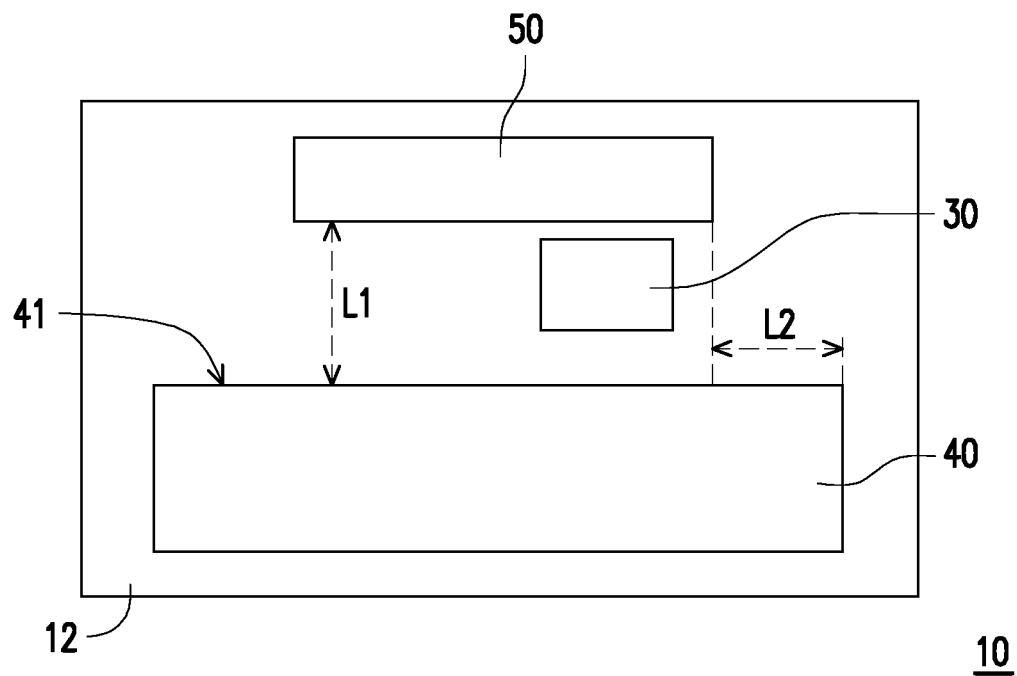
FIG. 4 is a schematic view showing relative positions of the antenna module and the first circuit module of the in-vehicle infotainment device of FIG. 1.
Figure 5:
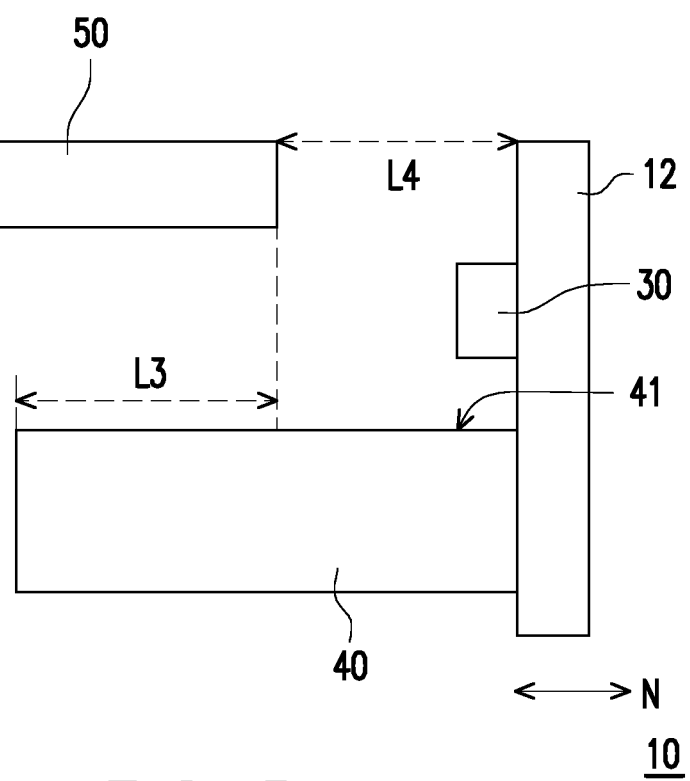
FIG. 5 is a schematic view showing relative positions of the antenna module, the first circuit module, and the display of the in-vehicle infotainment device of FIG. 1.

FIG. 4 is a schematic view showing relative positions of the antenna module and the first circuit module of the in-vehicle infotainment device of FIG. 1. FIG. 5 is a schematic view showing relative positions of the antenna module, the first circuit module, and the display of the in-vehicle infotainment device of FIG. 1. It is noted that, in FIG. 4 and FIG. 5, to clearly show the relative position of the main components of the disclosure, the main components are shown in a simplified manner as blocks.

Referring to FIG. 4 first, the viewing angle of FIG. 4 is a viewing angle from the lower-right position to the upper-left side in FIG. 3. A distance L1 between the antenna module 50 and the metal casing 40 is between 70 mm and 90 mm. In this embodiment, the antenna module 50 is located above the metal casing 40, and the distance L1 between the antenna module 50 and the metal casing 40 is, for example, the distance between the antenna module 50 and a top surface 41. However, the relative positions of the antenna module 50 and the metal casing 40 are not limited thereto. Since the metal casing 40 may be used to reflect the signal of the antenna module 50, when the distance L1 between the antenna module 50 and the metal casing 40 is within the above range, the metal casing 40 can reflect the signal of the antenna module 50 well (e.g., reflecting upward) to achieve better communication effect while still maintaining the overall volume of the in-vehicle infotainment device 10 as a relatively small volume. In an exemplary embodiment, the distance L1 between the antenna module 50 and the metal casing 40 is 75 mm, but the disclosure is not limited thereto.

In addition, in this embodiment, the left and right sides of the metal casing 40 exceed the left and right sides of the antenna module 50, and an excessive distance L2 is between 45 mm and 55 mm to have a sufficient reflective area while still maintaining a relatively small volume. In an embodiment, the distance L2 is 50.5 mm, but the disclosure is not limited thereto.

Referring to FIG. 5, the viewing angle of FIG. 5 is a viewing angle from the upper-right position to the lower-left side in FIG. 3. In this embodiment, a length L3 of the projection of the antenna module 50 on the top surface 41 of the metal casing 40 (i.e., the projection of the antenna module 50 downward on the top surface 41) which overlaps the top surface 41 in a normal direction N (the left-right direction in FIG. 5) of the display 12 is between 20 mm and 40 mm. If the length L3 is too small or there is no overlap, the overall volume of the in-vehicle infotainment device 10 may need to be larger. If the length L3 is too large, the metal casing 40 may affect the performance of the antenna module 50. When the length L3 is within the above range, better antenna performance may be achieved while still maintaining the overall volume of the in-vehicle infotainment device 10 as a relatively small volume. In an exemplary embodiment, the length L3 is 39 mm, but the disclosure is not limited thereto.

In addition, since the back of the display 12 is provided with a metal back plate, in order to prevent the display 12 from affecting the antenna performance, in this embodiment, a distance L4 between the antenna module 50 and the display 12 is between 100 mm and 120 mm to achieve a balance between the antenna performance and the size of the in-vehicle infotainment device. In an exemplary embodiment, the distance L4 is, for example, 110 mm, but the disclosure is not limited thereto.

Figure 6:
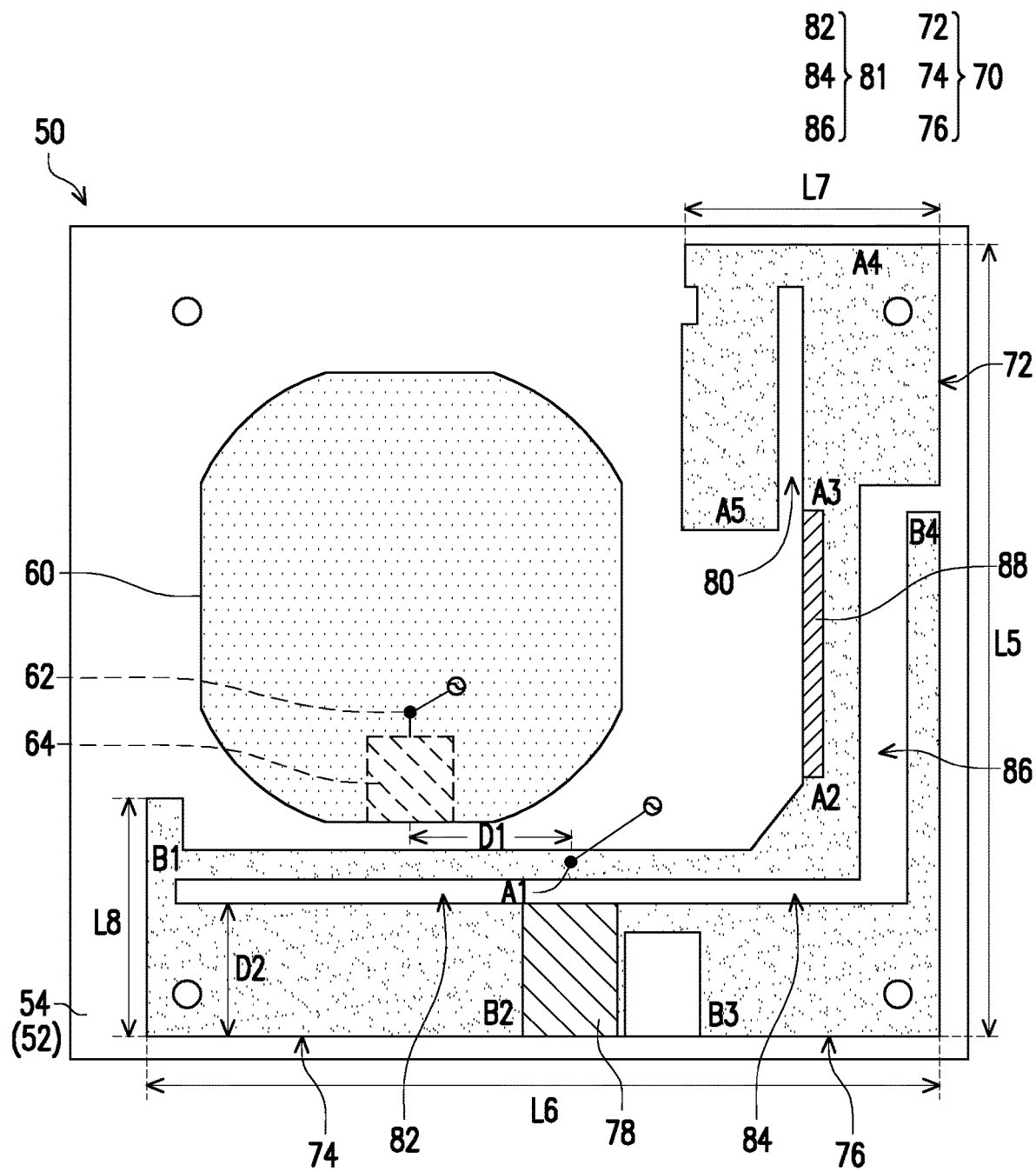
FIG. 6 is a schematic front view showing an antenna module according to an embodiment of the disclosure.
Figure 7:
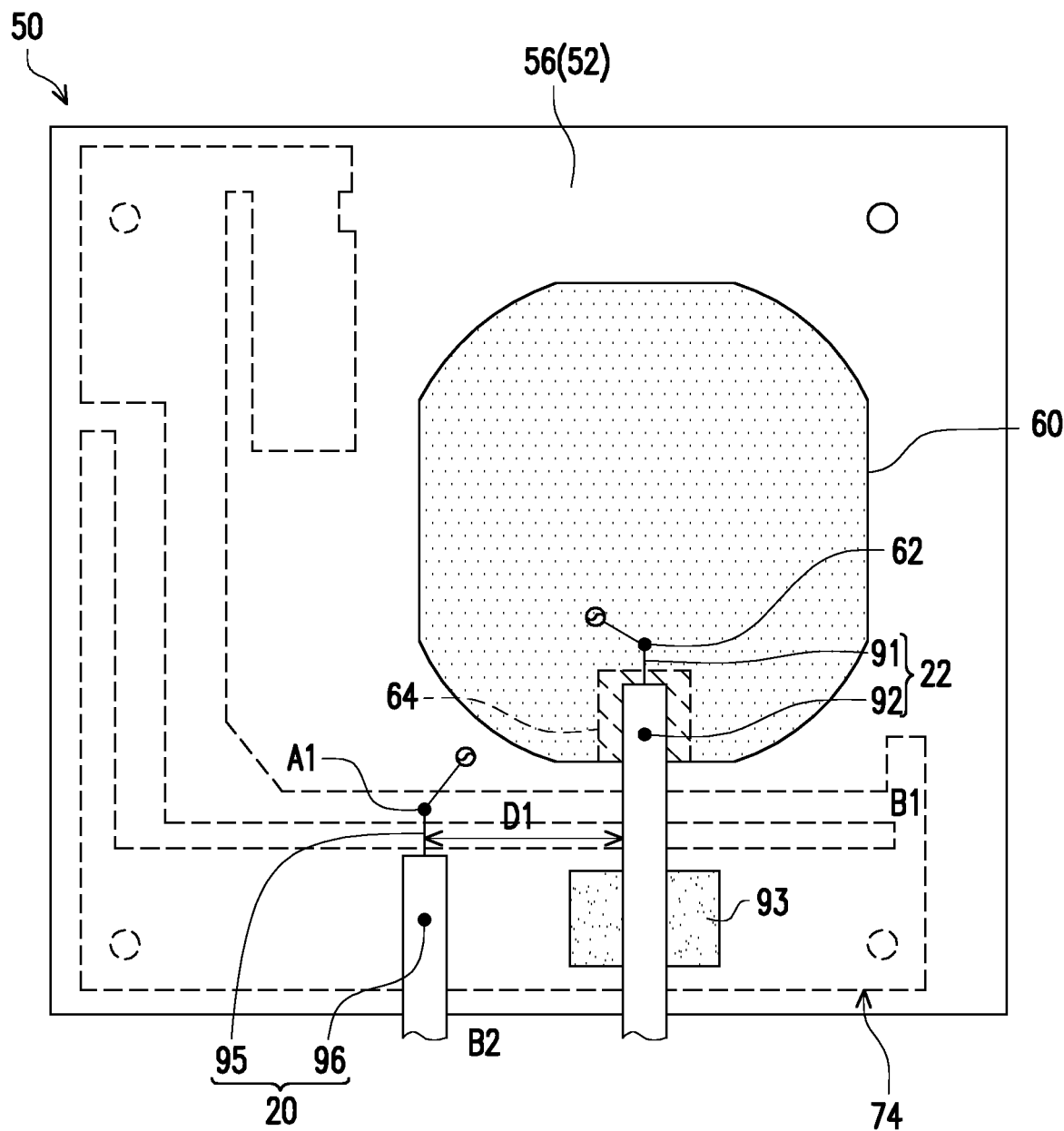
FIG. 7 is a schematic rear view showing the antenna module of FIG. 6.

The detailed antenna structure of the antenna module 50 will be described below. FIG. 6 is a schematic front view showing an antenna module according to an embodiment of the disclosure. Referring to FIG. 6, in this embodiment, the antenna module 50 further includes a substrate 52, a first antenna 60, and a second antenna 70. The substrate 52 has a first surface 54 and a second surface 56 (as shown in FIG. 7) opposite to each other, and the first antenna 60 and the second antenna 70 are disposed on the first surface 54. The first antenna 60 is a GPS antenna, and the second antenna 70 is an LTE antenna. Of course, in other embodiments, the types of the first antenna 60 and the second antenna 70 are not limited thereto. In an embodiment, the substrate 52 of the antenna module 50 may be omitted, and the first antenna 60 and the second antenna 70 may be directly formed on the casing of the in-vehicle infotainment device 10.

The first antenna 60 is configured to resonate a first high frequency band and has a first feed-in end 62 and a first ground end 64. In this embodiment, since the first antenna 60 is a GPS antenna, the central frequency point of the first high-frequency band is, for example, 1228 MHz or 1575 MHz but it is not limited thereto. The second antenna 70 is configured to resonate a low frequency band and a second high frequency band and has a second feed-in end A1 and a second ground end 78. In this embodiment, the second antenna 70 is an LTE antenna, the low frequency band is 698 MHz to 960 MHz, and the second high frequency band is 1600 MHz to 2200 MHz.

It can be seen from FIG. 6 that the second antenna 70 as a whole is formed in an L-shape. In other words, a partial segment extends in the up-down direction, and another partial segment extends in the left-right direction. The first antenna 60 is located in a notch defined by the L-shape of the second antenna 70 to make the overall size smaller.

A length L5 and a length L6 of the L-shape are less than 64 mm, for example, between 58 mm and 64 mm, and a width L7 and a width L8 of the L-shape are less than 22 mm, for example, between 17 mm and 22 mm. In an embodiment, the length L5 and the length L6 are, for example, 61 mm, the width L7 is, for example, 20 mm, and the width L8 is, for example, 18.5 mm, but the disclosure is not limited thereto.

In this embodiment, the second antenna 70 includes a first radiator 72 (from positions A1, A2, A3, and A4 to a position A5), a second radiator 74 (from positions A1 and B1 to a position B2), and a third radiator 76 (from a position B3 to a position B4).

The first radiator 72 extends from the second feed-in end A1 toward the right of FIG. 6 and has a first segment (positions A1 and A2), a second segment (positions A2, A3, and A4), and a third segment (positions A4 and A5) sequentially connected in a bent manner, and the second segment and the third segment are disposed in parallel. The first segment (positions A1 and A2) extends toward the right of FIG. 6, the second segment (positions A2, A3, and A4) extends toward the top of FIG. 6, and the third segment (positions A4 and A5) extends toward the bottom of FIG. 6.

In this embodiment, the second antenna 70 further includes a metal piece 88 disposed upright on the second segment and is specifically located between positions A2 and A3. The length of the metal piece 88 is between 15 mm and 25 mm, the height of the metal piece 88 is between 3 mm and 8 mm, and the thickness is between 0.1 mm and 0.3 mm. The metal piece 88 is used to increase the impedance bandwidth of LTE in the low frequency band (698 MHz to 960 MHz). In an embodiment, the length of the metal piece 88 is, for example, 20 mm, the height of the metal piece 88 is, for example, 5 mm, and the thickness is, for example, 0.2 mm, but the disclosure is not limited thereto.

The second radiator 74 extends from the second feed-in end A1 toward another direction (left of FIG. 6) and is connected to the second ground end 78 in a bent manner. Specifically, the second radiator 74 has a fourth segment (positions A1 and B1) and a fifth segment (positions B1 and B2) connected in a bent manner, and the fourth segment and the fifth segment are disposed in parallel. In FIG. 6, the second ground end 78 is located below the second feed-in end A1, the fourth segment (positions A1 and B1) extends toward the left of FIG. 6, and the fifth segment (positions B1 and B2) extends toward the right of FIG. 6.

Conventional LTE antennas are mostly designed in the form of dipole antennas. However, due to the limitations of the arrangement of the antenna module (two-in-one antenna) in the metal casing of the vehicle 1 (FIG. 1) and environmental factors such as the surrounding metal (e.g., the metal casing 40 of the first circuit module 35 in FIG. 3), it is difficult to prevent the antenna module from being affected by shielding or interference of the metal casing. In this embodiment, the first radiator 72 and the second radiator 74 of the second antenna 70 are designed in the form of planar inverted-F antennas (PIFA), so characteristics of the LTE at the low frequency band (698 MHz to 960 MHz) are less susceptible to the effect of the cable length and wiring of the coaxial transmission cable. In addition, the second radiator 74 is close to the form of a loop antenna. The above design allows the antenna module 50 to still perform well inside the metal casing of the vehicle 1 and in the environment of the surrounding metal (the metal casing 40 of the first circuit module 35).

In this embodiment, the first radiator 72 and the second radiator 74 are configured to collectively resonate a second frequency band and a third frequency band, and the second radiator 74 is configured to resonate a fourth frequency band. In this embodiment, the second frequency band is a low frequency band and is between 698 MHz and 960 MHz, the third frequency band (double frequency) is between 2000 MHz and 2200 MHz, and the fourth frequency band is between 1800 MHz and 2000 MHz, but the disclosure is not limited thereto.

In addition, a first slit 80 is formed between the third segment (positions A4 and A5) and a portion of the second segment (positions A3 and A4). The length of the first slit 80 is adjustably between 15 mm and 21 mm to adjust the frequency point of the second frequency band.

In addition, in this embodiment, a width D2 of the fifth segment (position B1 and B2) of the second radiator 74 is between 10 mm and 15 mm. The width D2 of the fifth segment being larger than 10 mm can avoid coupling to other resonance frequencies with the second coaxial transmission cable 20, which affects the characteristics of the main frequency of the second antenna 70.

The third radiator 76 extends from the second ground end 78 toward the right in FIG. 6 and is bent upward. The third radiator 76 has a sixth segment (extending toward the right in FIG. 6) and a seventh segment (extending toward the top in FIG. 6) connected in a bent manner. It can be seen from FIG. 6 that the sixth segment is located beside the first segment (positions A1 and A2), and the seventh segment is located beside part of the second segment (positions A2 and A3).

In this embodiment, the third radiator 76 is configured to resonate a fifth frequency band. In this embodiment, the fifth frequency band is between 1600 MHz and 1800 MHz. Therefore, the third frequency band, the fourth frequency band, and the fifth frequency band collectively form a second high frequency band of 1600 MHz to 2200 MHz, but the disclosure is not limited thereto. In addition, the second radiator 74 includes a portion of a second slit 81 (i.e., a first region 82), and another portion of the second slit 81 (i.e., a second region 84 and a third region 86) is disposed between the first radiator 72 and the third radiator 76. Specifically, the first region 82 of the second slit 81 is formed between the fourth segment and the fifth segment, the second region 84 of the second slit 81 is formed between the first segment and the sixth segment, and the third region 86 of the second slit 81 is formed between the second segment and the seventh segment. The first region 82, the second region 84, and the third region 86 of the second slit 81 communicate with each other to form an L-shaped slit. The length of the second slit 81 is adjustably between 78 mm and 84 mm to adjust the frequency point of the fourth frequency band and/or the fifth frequency band.

FIG. 7 is a schematic rear view showing the antenna module of FIG. 6. Referring to FIG. 7, in this embodiment, the first coaxial transmission cable 22 and the second coaxial transmission cable 20 are located on the second surface 56 of the substrate 52. The first feed-in end 62 is connected to a positive terminal 91 of the first coaxial transmission cable 22, the first ground end 64 is connected to a negative terminal 92 of the first coaxial transmission cable 22, and the first coaxial transmission cable 22 crosses a partial area of a projection of the fifth segment (positions B1 and B2) of the second radiator 74 on the second surface 56.

In this embodiment, the antenna module 50 further includes an insulating spacer 93, and the insulating spacer 93 is located on the second surface 56 of the substrate 52.

Specifically, the insulating spacer 93 is disposed between a partial area of a projection of the sixth segment on the second surface 56 and the first coaxial transmission cable 22, so that the first coaxial transmission cable 22 is further away from the second antenna 70. In this embodiment, the insulating spacer 93 is, for example, a foam, but the type thereof is not specifically limited. The dimensions of the insulating spacer 93 are, for example, 8 mm in length, 8 mm in width, and 1 mm in thickness but are not limited thereto.

In addition, the second feed-in end A1 is connected to a positive terminal 95 of the second coaxial transmission cable 20, and the second ground end 78 is connected to a negative terminal 96 of the second coaxial transmission cable 20. In this embodiment, a distance D1 between the first feed-in end 62 and the second feed-in end A1 is larger than 10 mm. Specifically, the distance D1 is between 10 mm and 15 mm. Since the first coaxial transmission cable 22 and the second coaxial transmission cable 20 are disposed in parallel, the distance between the first coaxial transmission cable 22 and the second coaxial transmission cable 20 is also between 10 mm and 15 mm, for example, 12 mm. In the cable-out design of the first coaxial transmission cable 22 and the second coaxial transmission cable 20, the distance D1 is larger than 10 mm to avoid overlapping and avoid coupling to other resonance frequencies, which affects the main frequency characteristics of the first antenna 60 and the second antenna 70.

It is noted that, in this embodiment, the first antenna 60 (a GPS ceramic block antenna) and the second antenna 70 are designed on the first surface 54 of the substrate 52, the GPS active circuit (including the shielding frame) (not shown) of the first antenna 60, the first coaxial transmission cable 22, and the second coaxial transmission cable 20 are designed on the second surface 56 of the substrate 52, so that the signals of the two antennas can be reflected by the metal structure of the first circuit module 35 (i.e., the first circuit board 42 and the metal casing 40 of the in-vehicle infotainment device 10), and their radiant energy can be concentrated and transmitted toward the windshield of the vehicle 1.

In addition, in this embodiment, the first antenna 60 and the second antenna 70 transmit signals to the corresponding first circuit board 42 and the second circuit board 30 respectively via the first coaxial transmission cable 22 and the second coaxial transmission cable 20, and in the design, the first ground end 64 and the second ground end 78 are not connected together. In other words, the first ground end 64 is isolated from the second ground end 78 to reduce the effect of mutual interference of the two antennas. In addition, by placing the insulating spacer 93 between the first coaxial transmission cable 22 and the second antenna 70, the first coaxial transmission cable 22 can be prevented from contacting the second antenna 70, and the isolation effect can be improved.

Figure 8:
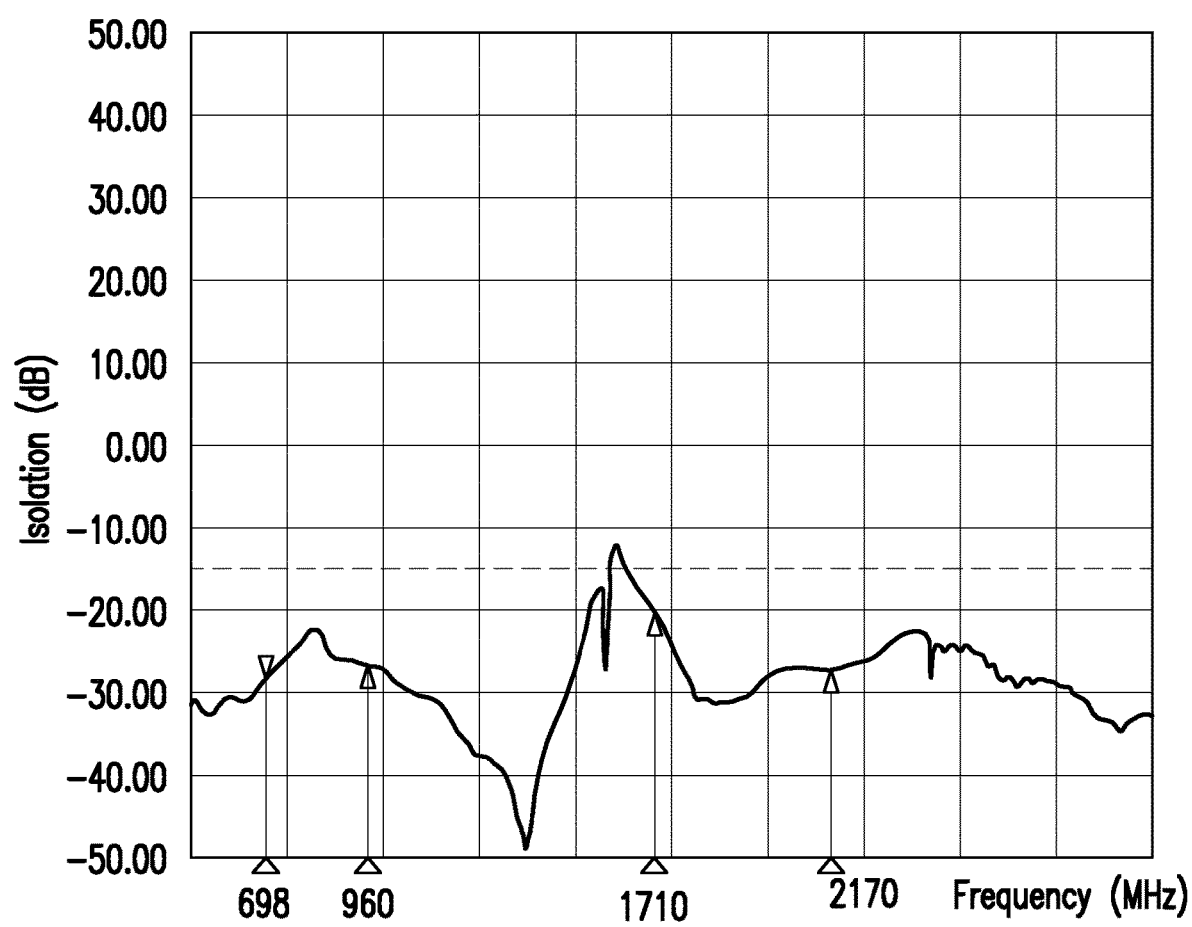
FIG. 8 is a frequency-isolation relationship diagram of the antenna module of FIG. 6.

FIG. 8 is a frequency-isolation relationship diagram of the antenna module of FIG. 6. Referring to FIG. 8, in this embodiment, the antenna module 50 may have an isolation of less than −20 dB at the frequency of 698 MHz to 960 MHz and 1710 MHz to 2170 MHz and thus has good performance. The antenna module 50 may have an isolation of less than −12.5 dB at the frequency of 1575 MHz to 1602 MHz and thus also has good performance.

Figure 9:
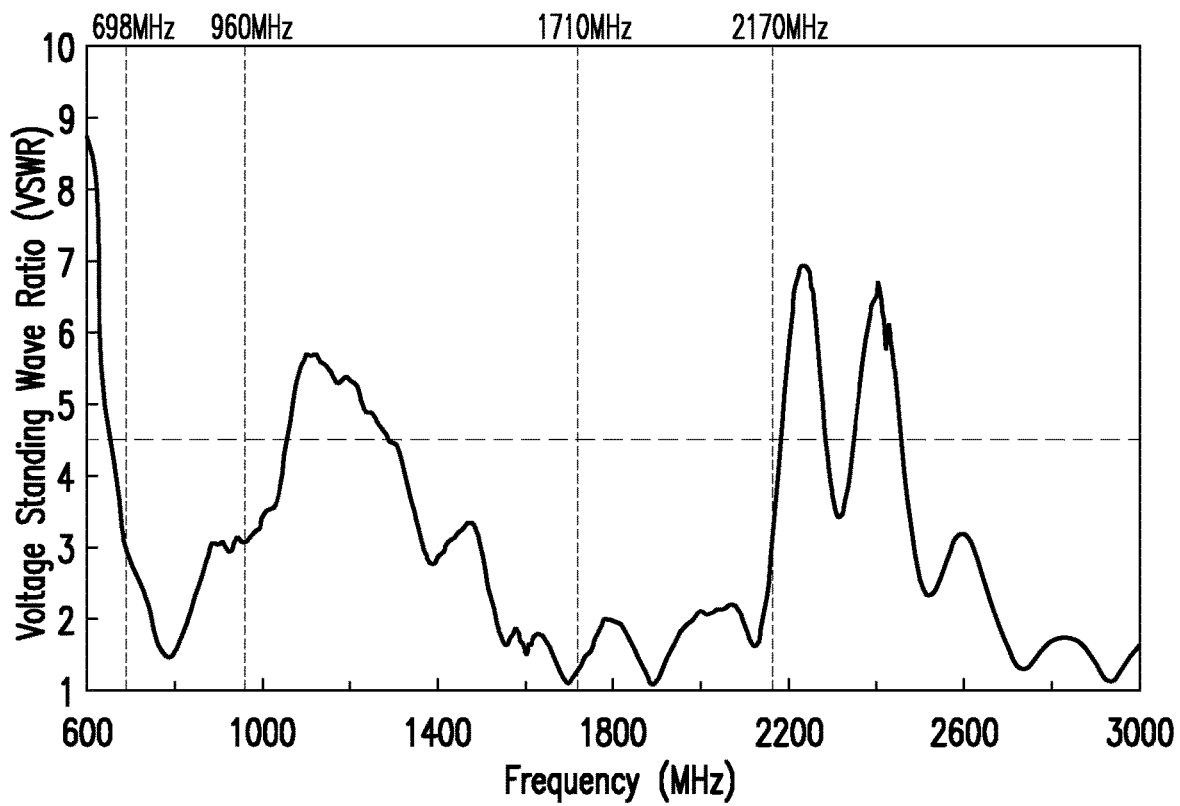
FIG. 9 is a relationship diagram of a frequency and a voltage standing wave ratio of the antenna module of FIG. 6.

FIG. 9 is a relationship diagram of a frequency and a voltage standing wave ratio of the antenna module of FIG. 6. Referring to FIG. 9, in this embodiment, at the low frequency (698 MHz to 960 MHz), the voltage standing wave ratio (VSWR) of the antenna module 50 is maintained below 4.5 and has stable performance. Compared with the conventional dipole antenna, the performance of the voltage standing wave ratio of the antenna module 50 of this embodiment is less susceptible to the effect of the first coaxial transmission cable 22 and the second coaxial transmission cable 20. In addition, between 1710 MHz and 2170 MHz, the voltage standing wave ratio of the antenna module 50 is also maintained below 4.5 and thus has good performance.

Figure 10:
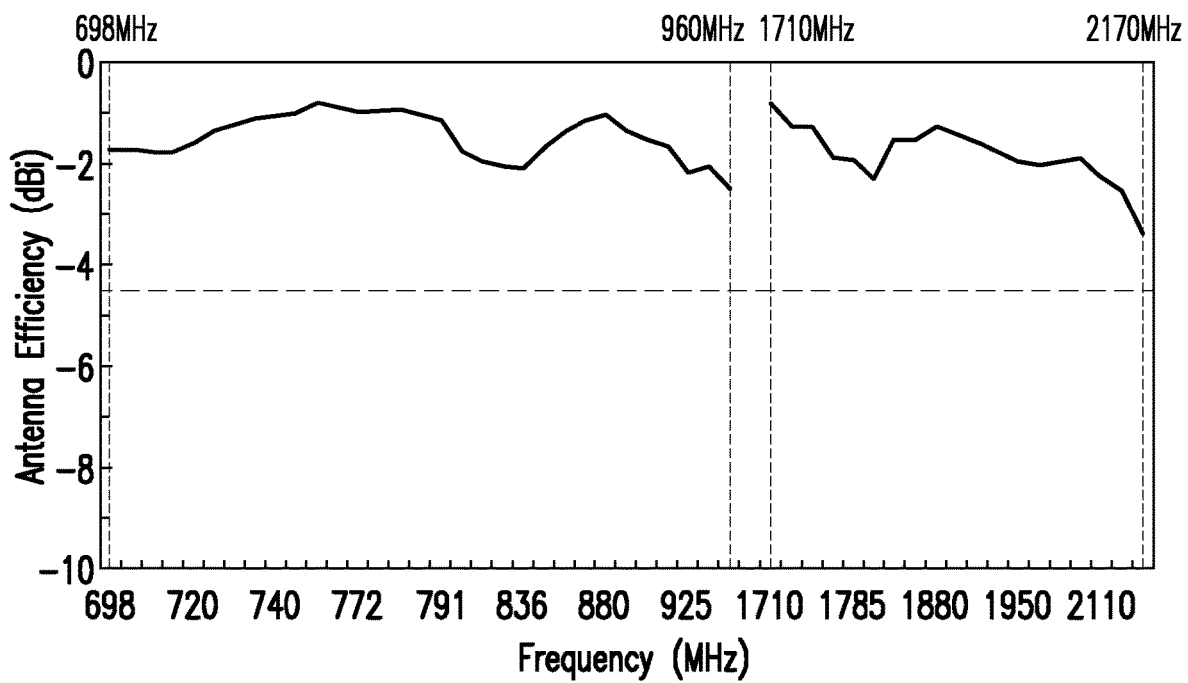
FIG. 10 is a relationship diagram of a frequency and an antenna efficiency of the antenna module of FIG. 6.

FIG. 10 is a relationship diagram of a frequency and an antenna efficiency of the antenna module of FIG. 6. Referring to FIG. 10, in this embodiment, the antenna efficiency of the second antenna 70 (LTE antenna) at the low frequency band (698 MHz to 960 MHz) is between −0.8 dBi and −2.5 dBi, and the antenna efficiency of the second antenna 70 at the second high frequency band (1710 MHz to 2170 MHz) is between −0.8 dBi and −3.4 dBi, which are both higher than −4.5 dBi and have good performance. The first antenna 60 (GPS antenna) can exhibit both characteristics of a current average gain larger than −1.5 dBi and a peak gain larger than −1 dBi (not shown).

It is noted that, in this embodiment, the volume occupied by the second antenna 70 is 61 mm in length, 61 mm in width, and 5.8 mm in height (including the metal piece 88 with a height of 5 mm), the dimensions of the first antenna 60 (including an LNA active circuit and a metal shield) are 35 mm in length, 33 mm in width, and 10 mm in height. The first antenna 60 and the second antenna 70 are combined into a two-in-one antenna with a length of 70 mm, a width of 70 mm, and a height of 17 mm, which has a quite small overall volume, can be disposed in the metal vehicle casing, and has good isolation, antenna efficiency, and voltage standing wave ratio.

Figure 11:
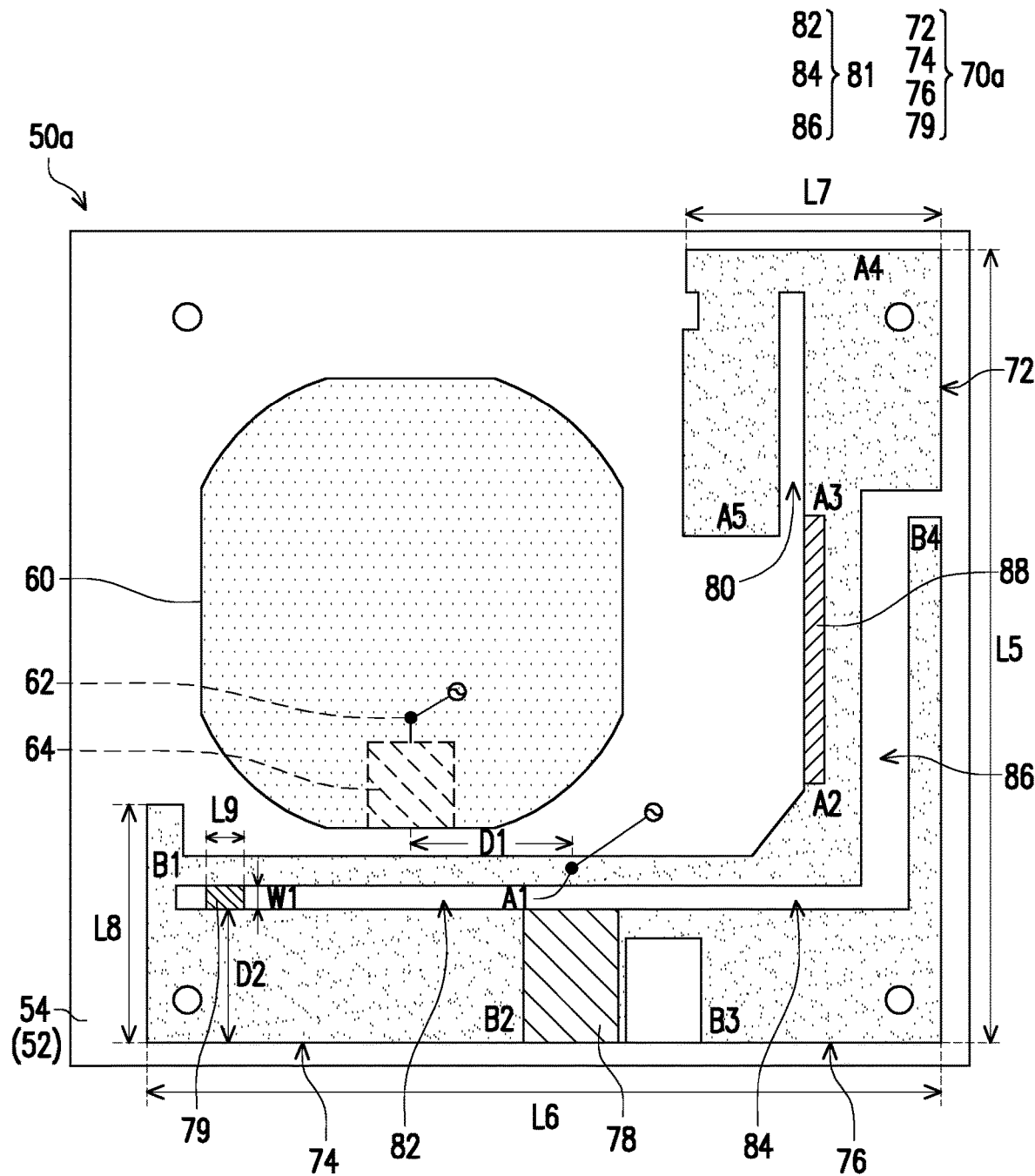
FIG. 11 is a schematic front view showing an antenna module according to another embodiment of the disclosure.

FIG. 11 is a schematic front view showing an antenna module according to another embodiment of the disclosure. Referring to FIG. 11, the main difference between an antenna module 50a of FIG. 11 and the antenna module 50 of FIG. 6 lies in that, in this embodiment, a second antenna 70a of the antenna module 50a further includes a third ground end 79, which is disposed in a portion of the second slit 81 (i.e., the first region 82 of the second slit 81) and is connected to the second radiator 74. Specifically, the two ends of the third ground end 79 are respectively connected to the fourth segment (positions A1 and B1) and the fifth segment (positions B1 and B2) of the second radiator 74. A length L9 of the third ground end 79 is about 2.5 mm to 3.5 mm and is, for example, 3 mm. A width W1 of the third ground end 79 is about 1 mm to 2 mm and is, for example, 1.5 mm. The third ground end 79 enables the second antenna 70a to simultaneously support the n77, n78, and n79 frequency bands (the frequency from 3300 MHz to 5000 MHz) and exhibit a wider frequency effect.

Figure 12:
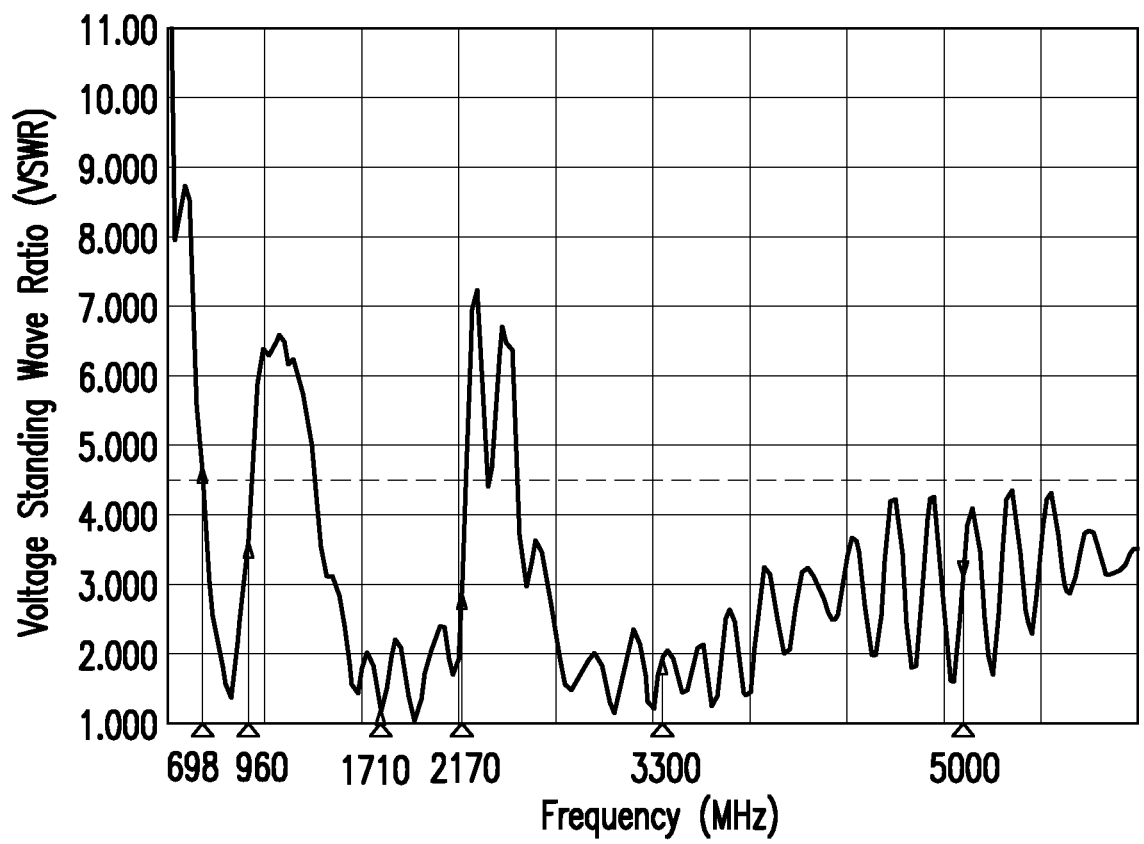
FIG. 12 is a relationship diagram of a frequency and a voltage standing wave ratio of the antenna module of FIG. 11.

FIG. 12 is a relationship diagram of a frequency and a voltage standing wave ratio of the antenna module of FIG. 11. In this embodiment, at the low frequency band (698 MHz to 960 MHz), the voltage standing wave ratio of the second antenna 70 (LTE antenna) is maintained below 4.5 and has stable performance. In addition, at the second high frequency band (1710 MHz to 2170 MHz), the voltage standing wave ratio is also maintained below 4.5 and has good performance. In addition, at the frequency bands of n77, n78, and n79 (3300 MHz to 5000 MHz), the voltage standing wave ratio is also maintained below 4.5 and has good performance.

In summary of the above, the antenna module of the disclosure has the first antenna and the second antenna and can provide the advantage of multiple antennas. The first antenna is located in a notch defined by the L-shape of the second antenna, which can reduce the overall size. The first antenna and the second antenna each have their own ground end, so that the two antennas can have good isolation. In addition, the first radiator of the second antenna extends from the second feed-in end and has the first segment, the second segment, and the third segment sequentially connected in a bent manner. The first slit is formed between the third segment and a portion of the second segment. The second radiator extends from the second feed-in end toward another direction and is connected to the second ground end. The second radiator has the fourth segment and the fifth segment connected in a bent manner, and the first region of the second slit is formed between the fourth segment and the fifth segment. With the above structure, the first radiator and the second radiator of the second antenna are in the form of a PIFA, which is less susceptible to the effect of routing and the metal environment and can be disposed in the metal vehicle casing, while good characteristics of the second antenna at the low frequency band (e.g., the second frequency band) can still be maintained.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An antenna module comprising:
    a first antenna configured to resonate a first high frequency band and having a first feed-in end and a first ground end; and
    a second antenna formed in an L-shape, wherein the first antenna is located in a notch defined by the L-shape, the second antenna is configured to resonate a low frequency band and a second high frequency band and has a second feed-in end and a second ground end, and the second antenna comprises:
        a first radiator extending from the second feed-in end along a direction and comprising a first slit;
        a second radiator extending from the second feed-in end along another direction opposite to the direction and connected to the second ground end in a bent manner, wherein the second radiator comprises a portion of a second slit; and
        a third radiator extending from the second ground end along the direction, wherein another portion of the second slit is disposed between the first radiator and the third radiator,
        wherein the first radiator and the second radiator are configured to collectively resonate a second frequency band and a third frequency band, the second radiator is configured to resonate a fourth frequency band, and the third radiator is configured to resonate a fifth frequency band, wherein the low frequency band is the second frequency band, and the third frequency band, the fourth frequency band, and the fifth frequency band collectively form the second high frequency band.

2. The antenna module according to claim 1, wherein the first radiator comprises a first segment, a second segment, and a third segment sequentially connected in a bent manner, wherein the second segment and the third segment are disposed in parallel, and the first slit is formed between the third segment and a portion of the second segment.

3. The antenna module according to claim 2, wherein the second radiator comprises a fourth segment and a fifth segment connected in a bent manner, wherein the fourth segment and the fifth segment are disposed in parallel, and a first region of the second slit is formed between the fourth segment and the fifth segment.

4. The antenna module according to claim 3, wherein the third radiator comprises a sixth segment and a seventh segment connected in a bent manner, wherein the sixth segment is located beside the first segment, the seventh segment is located beside part of the second segment, a second region of the second slit is formed between the first segment and the sixth segment, a third region of the second slit is formed between the second segment and the seventh segment, and the first region, the second region, and the third region of the second slit communicate with each other.

5. The antenna module according to claim 1, further comprising:
    a third ground end disposed in a portion of the second slit and connected to the second radiator.

6. The antenna module according to claim 1, further comprising:
    a substrate having a first surface and a second surface opposite to each other, wherein the first antenna and the second antenna are disposed on the first surface;
    a first coaxial transmission cable located on the second surface of the substrate, wherein the first feed-in end is connected to a positive terminal of the first coaxial transmission cable, the first ground end is connected to a negative terminal of the first coaxial transmission cable, and the first coaxial transmission cable crosses the second radiator; and
    an insulating spacer disposed between the second radiator and the first coaxial transmission cable.

7. The antenna module according to claim 6, further comprising:
    a second coaxial transmission cable located on the second surface of the substrate, wherein the second feed-in end is connected to a positive terminal of the second coaxial transmission cable, the second ground end is connected to a negative terminal of the second coaxial transmission cable, a distance between the first coaxial transmission cable and the second coaxial transmission cable is between 10 mm and 15 mm.

8. The antenna module according to claim 1, wherein a length of the first slit is adjustably between 15 mm and 21 mm to adjust a frequency point of the second frequency band.

9. The antenna module according to claim 1, wherein a length of the second slit is adjustably between 78 mm and 84 mm to adjust a frequency point of the fourth frequency band and/or the fifth frequency band.

10. The antenna module according to claim 1, wherein the second antenna further comprises a metal piece disposed upright on the second segment, wherein a length of the metal piece is between 15 mm and 25 mm and a height of the metal piece is between 3 mm and 8 mm to increase an impedance bandwidth of the second frequency band.

11. The antenna module according to claim 1, wherein a distance between the first feed-in end and the second feed-in end is between 10 mm and 15 mm.

12. The antenna module according to claim 1, wherein a width of the L-shape is less than 22 mm, and a length of the L-shape is less than 64 mm.

13. The antenna module according to claim 1, wherein the first antenna comprises a GPS antenna, the second antenna comprises an LTE antenna, the low frequency band is between 698 MHz and 960 MHz, and the second high frequency band is between 1600 MHz and 2200 MHz.

14. An in-vehicle infotainment device comprising:
a display;
an antenna module comprising:
  a first antenna configured to resonate a first high frequency band and having a first feed-in end and a first ground end; and
  a second antenna formed in an L-shape, wherein the first antenna is located in a notch defined by the L-shape, the second antenna is configured to resonate a low frequency band and a second high frequency band and has a second feed-in end and a second ground end, and the second antenna comprises:
    a first radiator extending from the second feed-in end along a direction and comprising a first slit;
    a second radiator extending from the second feed-in end along another direction opposite to the direction and connected to the second ground end in a bent manner, wherein the second radiator comprises a portion of a second slit; and
    a third radiator extending from the second ground end along the direction, wherein another portion of the second slit is disposed between the first radiator and the third radiator,
  wherein the first radiator and the second radiator are configured to collectively resonate a second frequency band and a third frequency band, the second radiator is configured to resonate a fourth frequency band, and the third radiator is configured to resonate a fifth frequency band, wherein the low frequency band is the second frequency band, and the third frequency band, the fourth frequency band, and the fifth frequency band collectively form the second high frequency band;
  a first circuit module comprising a first circuit board signal-connected to the first antenna of the antenna module and the display; and
  a second circuit board signal-connected to the second antenna of the antenna module.

15. The in-vehicle infotainment device according to claim 14, wherein the first circuit module comprises a metal casing, the first circuit board is located in the metal casing, and a distance between the antenna module and the metal casing is between 70 mm and 90 mm.

16. The in-vehicle infotainment device according to claim 14, wherein the first circuit module comprises a metal casing, and the antenna module is located above the metal casing, and a length of a projection of the antenna module on a top surface of the metal casing overlapping the top surface in a normal direction of the display is between 20 mm and 40 mm.

17. The in-vehicle infotainment device according to claim 14, wherein a distance between the antenna module and the display is between 100 mm and 120 mm.

* * * * *